OR RE 20,697
April 12, 1938. W. L. THOMAS Re. 20,697
DOORWAY STRUCTURE FOR BOX CARS
Original Filed Sept. 6, 1933 3 Sheets-Sheet 1
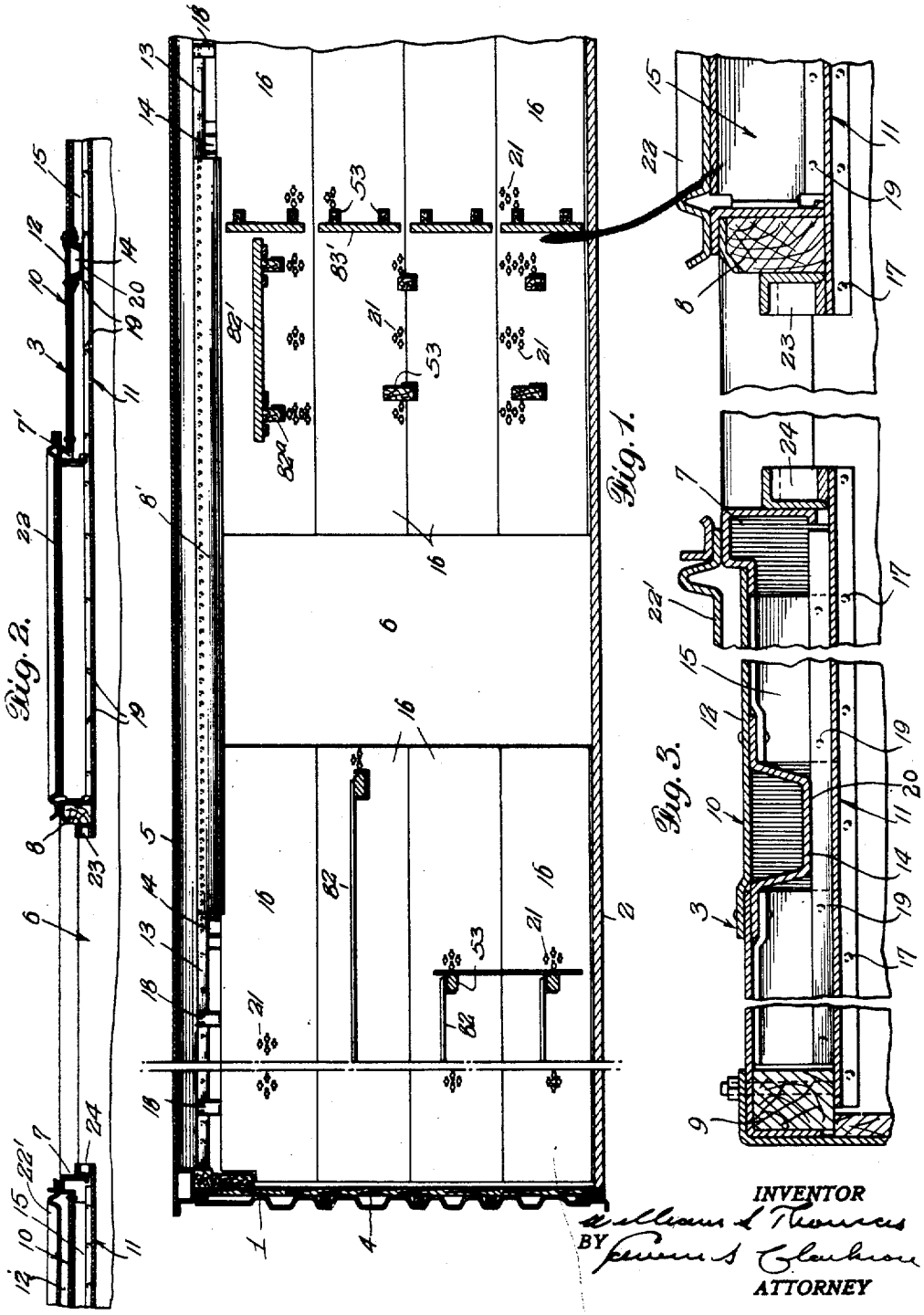
INVENTOR
William L. Thomas
BY Francis S. Clarkson
ATTORNEY April 12, 1938. W. L. THOMAS Re. 20,697
DOORWAY STRUCTURE FOR BOX CARS
Original Filed Sept. 6, 1933 3 Sheets-Sheet 2
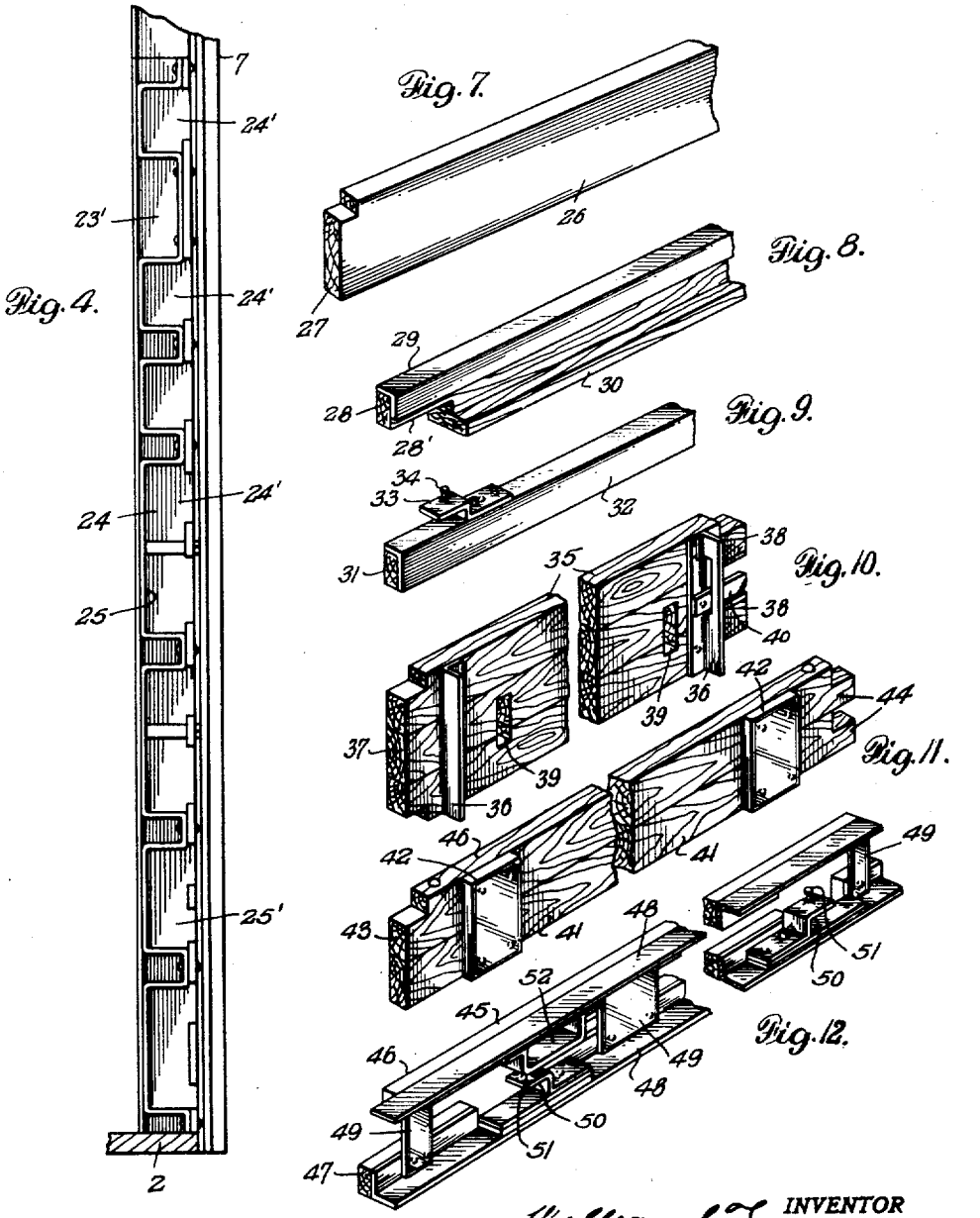
William L. Thomas INVENTOR
BY Lewis S. Clarkson
ATTORNEY Search April 12, 1938. W. L. THOMAS Re. 20,697

DOORWAY STRUCTURE FOR BOX CARS

Original Filed Sept. 6, 1933 3 Sheets-Sheet 3

INVENTOR
William L. Thomas
BY Fenwick & Clarkson
ATTORNEY

105. RAILWAY ROLLING STOCK
376

Search Ro

Reissued Apr. 12, 1938

Re. 20,697

UNITED STATES PATENT OFFICE 20,697

DOORWAY STRUCTURE FOR BOX CARS

William L. Thomas, Haverstraw, N. Y., assignor to The New York Central Railroad Company, a corporation of New York Original No. 2,030,773, dated February 11, 1936, Serial No. 688,397, September 6, 1933. Divided and application April 4, 1934, Serial No. 719,010, Patent No. 2,016,731, dated October 8, 1935. Application for reissue December 29, 1937, Serial No. 182,367

8 Claims. (Cl. 105—376)

This invention relates to improvements in box cars of the type designed for shipping mixed freight, or freight consisting of articles or parts of various forms, sizes and compositions, and the present application is an application for reissue of Patent No. 2,016,731 whose application, Serial No. 719,010, filed April 4, 1934, was a division of my prior application filed September 6, 1933, Serial No. 688,397 which eventuated in Patent No. 2,030,773 dated Feb. 11, 1936. More particularly the present invention relates to a doorway structure for box cars of such type, and especially one of a type adapted for shipping automobile body parts or other automobile parts of various kinds or similar commodities.

In my aforesaid application, Serial No. 688,397, eventuating in Patent No. 2,030,773, dated February 11, 1936, I disclosed a construction of car body and cooperating means for readily and conveniently variably partitioning the interior of a box car to divide the same into holding compartments or provide the same with supporting floors or platforms of suitable size or sizes for different kinds or sizes of goods to be shipped, whereby one and the same car may be used to hold mixed kinds and/or sizes of goods in separate lots in such manner as to keep the lots separated from each other and to enable the full capacity of the car to be used for shipment of such goods to the same destination or different destinations.

The principle of the present invention consists in constructing the doorways of such a car so as to increase the available storage capacity of the car and in providing supporting and partitioning means for utilizing the portion of the body for storage purposes transversely of the body from doorway to doorway.

The object of the present invention, therefore, is to provide a doorway construction designed and adapted to efficiently perform these functions, combined with a wall structure firmly supporting and bracing the parts of the doorway structure for such purposes, together with supporting and partition-forming members of interchangeable type for application to the parts of the doorway and to each other, whereby supporting compartments or supporting platforms may be produced as circumstances may require for the utilization of the car space transversely from doorway to doorway for storage purposes.

The invention consists of the novel and improved features of construction, combination and arrangement of parts in a doorway and partitioning means for box cars as hereinafter fully described and set forth in the appended claims, reference being had to the accompanying drawings showing the invention, in which:—

Fig. 1 is a vertical longitudinal section through a portion of a railway car embodying my invention.

Fig. 2 is a horizontal section through one side of the car between standard door posts, showing particularly the doorway construction.

Fig. 3 is a horizontal section similar to Fig. 2 on an enlarged scale, and with parts broken away, through a side wall of the car and showing the construction of such wall and a door post.

Fig. 4 is a fragmentary vertical section through one side of the car at the doorway and looking toward one of the door posts.

Figure 5:
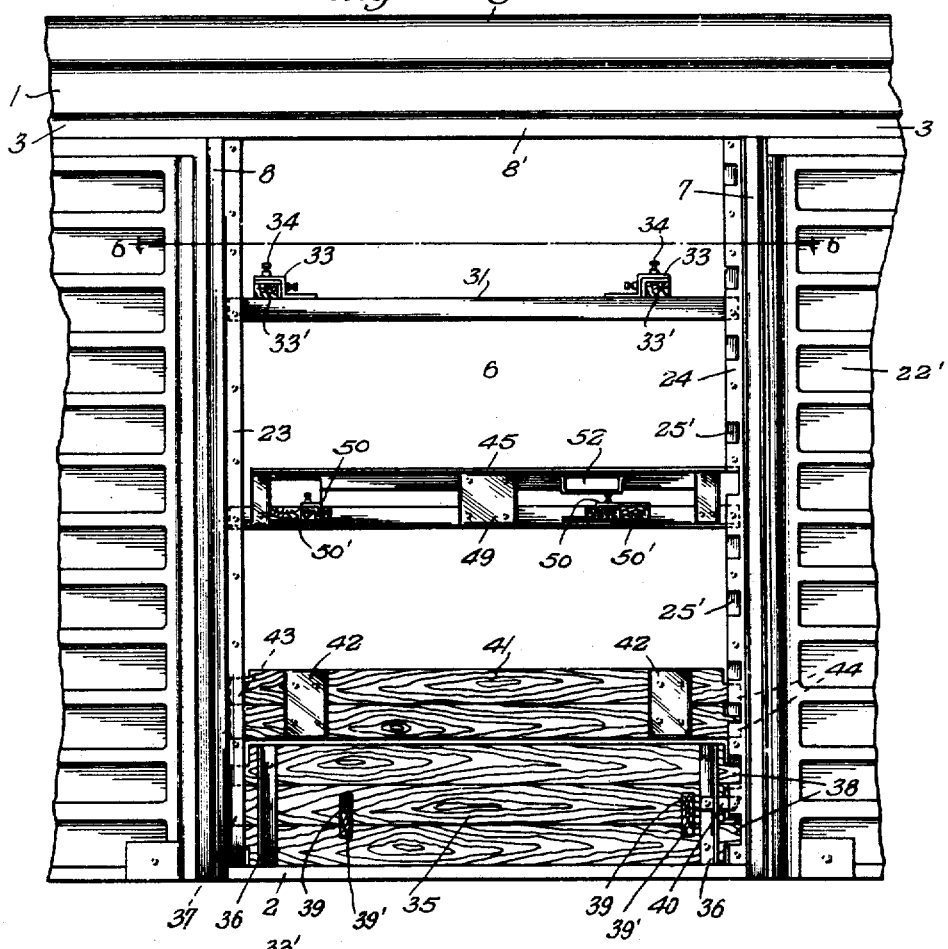
Fig. 5 is a side elevation looking from the exterior toward the doorway at one side of the car.
Figure 6:
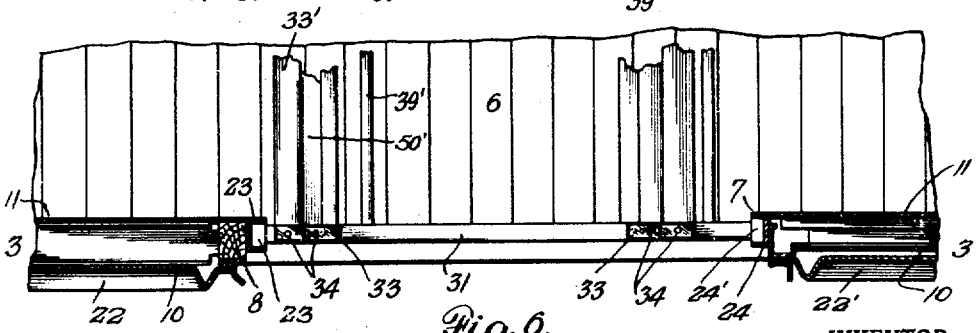
Fig. 6 is a sectional plan view on line 6—6 of Fig. 5.

Figs. 7, 8, 9, 10, 11, and 12 are views of some of the various types of longitudinal compartment-forming or supporting partitions which may be employed in the doorway region of the car.

Referring now more particularly to the drawings, 1 designates the car body which is or may be of usual box body form, and comprises the bottom 2, side walls 3, end walls 4 and roof 5. The bottom 2, end walls 4 and roof 5 may be of any suitable and approved construction, the present invention residing in the novel construction of the doorways and coacting parts of the walls and supporting or partitioning features.

Each side wall 3 is provided with a central doorway structure or frame providing a narrow doorway 6, said doorway structure or framing including terminal angle metal door posts 7, 7', spaced the conventional distance apart, an intermediate door post 8, and a metal lintel beam 8' extending the full distance between the posts 7, 7', and each portion of the wall 3 between each post 7, 7' and the corner post 9 at its intersection with the end wall 4 on the same side of the transverse center of the body comprises outer and inner wall sections 10 and 11. The outer wall section 10 is formed of vertically extending metal sheets 12 riveted or otherwise secured to each other at their lapping edges and also secured to the side sill channel and Z-bar eaves beams 13, to channeled intermediate posts 14, and to longitudinal (horizontal) angle beams 15 forming with the respective posts a rigid wall framing. The inner wall section 11 consists of longitudinally (horizontally) extending sheets 16, the lowermost sheet having its lower longitudinal edge flanged inwardly and secured to the floor by lag screws or bolts 17, the uppermost sheet having its upper longitudinal edge turned outwardly or toward the wall section 10 and secured at intervals along the major length of the car by brackets 18 to the eaves beam 13 and in the region of the doorway 6 to the lintel beam 8', the adjacent edges of the sheets of the series being flanged toward the wall section 10 and bolted or riveted, as at 19, to the angles 15 and welded, as at 20, to the posts 14, the sheets of both wall sections 10 and 11 thus being firmly united to each other and to a rigid framing and providing a double wall of great strength to serve as a support for the partitioning and supporting members. This double wall structure is hollow, the wall sections 10 and 11 being held spaced by the framing, so that an air space is provided to insulate the interior of the car against rapid heat exchange action between the same and the outer atmosphere. This hollow space may, if desired, be filled with insulating material of any suitable and approved sort. As shown, the sheets 10 are perforate, being formed throughout with longitudinal (horizontal) and transverse (vertical) rows of slots or openings 21. Each opening is of double key-hole-shaped type, having alined straight end portions intersecting a central circular enlargement. These openings form keepers for interchangeable locking engagement with headed engaging and locking elements on partitioning and supporting members, as hereinafter described.

The doorway 6 in each wall is specially formed or modified as compared with a conventional construction in order that its width may be reduced when employing the car as a partitioned car, i. e., converting it into a partitioned car, for the purpose set forth. To this end the intermediate door post 8 in each wall 3 is provided between the usual posts 7 and 7', the inner sheathing is extended between the posts 7', 8 to close the inner side of that half of the normal doorway space between said posts 7', 8, while a door 22 is mounted so that it may be used to form a wall portion closing the outer side of the space or half of the doorway between the posts 8 and 7' as long as the car is used as a partitioned car, leaving the remaining half of the doorway between the posts 7 and 8 normally open for service use, but adapted to be closed whenever desired by a door 22'. By the construction described one-half of the inner side of the normal doorway space is closed by the extended portion of the sheathing, and the outer side of this half of the doorway space is closed by the door 22. By this means a narrow service doorway of sufficient width is left for access to the car and loading purposes as well as unloading purposes if desired, which narrow doorway may be conveniently closed, and this arrangement allows the closed half of the doorway to be packed solidly from side to side of the car to increase its storage capacity. Secured to the posts 7 and 8 at the sides of the open portion of the doorway are channeled holders 23 and 24, each consisting of a U-shaped channel member having a zig-zag partition strip 25 arranged therein and forming superimposed holding sockets 23' and 24' of different depths. These sockets, in the case of the holder 23, are closed at their outer and inner sides and open only at the open side of the channel facing the doorway, while in the case of the holder 24 the sockets are not only open at the side facing the doorway but have lateral inlet and exit openings 25' formed by slots or notches in the outer flange of the holder 24. The car body thus constructed is adapted to be subdivided into goods holding compartments at desired points and levels or provided with goods supporting platforms at desired points and levels by means of partitioning and supporting members and doorway closing members of various kinds or types, some of which are herein shown, the construction and use of which I will now proceed to describe.

With the construction above-described it will be understood that upon removal of the post 8 and the sheathing extension, which may be of removable character, the car may be reconverted back into a car having a doorway of conventional width. In this manner, and by the use of suitable removable parts, which are easily applied and removed, any ordinary type of box car may be converted into a car having a narrow doorway for the purposes described, and reconverted back into a car having a doorway of regulation width.

Figs. 7 to 12, inclusive, of the drawings show different sizes or depths and types of closure and supporting members for use across the open doorways to serve as supports for partitions or platform forming elements arranged to provide compartments or platforms at different points and levels from side to side of the car in the doorway region. As shown, these supports or partitions may be of different depths to secure a desired spacing of superposed platforms formed thereby. For example, a single piece or unitary wooden supporting member in the form of a bar 26 is provided to extend between the holders 23 and 24 with its ends seated in the proper sockets 23', 24' of the holders 23 and 24, the ends of which bar are partially cut away to form tongues 27 (one of which is shown) to engage the holder sockets. This bar may be of any suitable depth and one of these bars may be provided across each doorway at the sides of the car on which articles may be directly supported or on which planks may be laid to form a supporting platform. Fig. 8 shows another form of supporting member comprising a bar 28 reinforced by an angle iron wear piece 29 and to the base of which is secured a base piece 30 disposed edgewise at right angles thereto and forming therewith a supporting member of inverted T-shape in cross section. The ends of the bar 28 project beyond the ends of the base piece 30 and are cut away to form tongues 28', one of which is shown, for engagement with the sockets in the holders 23 and 24. On this support bars or planks extending transversely of the car may be laid to form a supporting platform for goods at a desired level. In the cases of the use of the bars 26 and 28 the platform bars or planks laid thereon may be nailed or otherwise properly secured thereto. In Fig. 9 is shown a supporting member comprising a bar 31 having an angle metal reinforcement 32 secured thereto, which bar may be of proper cross-sectional dimensions so that its ends may be fitted directly into proper sockets of the holders 23 and 24. To the upper surfaces of this bar one or more L-shaped or half loop clips 33 may be secured, each to receive a supporting bar or plank 33' resting on the bar 31, and each clip having a clamping screw 34 to secure the supporting bar or plank in position. Fig. 10 shows a partition or supporting member 35 formed of three superposed bars united by angle metal ties 36, one end of the member 35 being formed to provide a tongue 37 to engage one of the sockets in the holder 23 and the other end of the member 35 being provided with spaced tongues 38 to engage a socket or adjacent sockets in the holder 24. This member is formed with spaced openings 39 to receive bars 39' on which platform boards may be laid or from which goods may be directly supported. The tie member 36 adjacent to the tongues 38 carries a pivoted latch 40 to engage the holder 24 to retain the member 35 against any possibility of casual displacement therefrom. Fig. 11 shows a supporting or partitioning member 41 composed of a pair of superposed bars secured together by tie blocks 42 and formed to provide at one end a tongue 43 to engage the holder 23 and at its opposite end with spaced tongues 44 to engage the holder 24. This member 41 is adapted to serve as a support for bars, planks or other goods supports or compartment or platform forming members. Fig. 12 shows a supporting or partitioning member 45 comprising spaced top and bottom bars 46 and 47 reinforced by metal angles 48 and connected and held in spaced relation by ties 49. Between the bars 46 and 47 one or more platform or goods supporting bars may be received and held in half clips 50 provided with clamping screws 51 or in a loop 52, one or more of which may be provided.

Supporting or partitioning members of the types shown in Figs. 7 to 12, inclusive, may be used in pairs across the doorways at opposite sides of the car, to serve as auxiliary closures for said doorways in connection with doors or to serve as grate-like closures in the absence of doors. They also may be used to support compartment forming partitions or platform supporting bars whereby one or more compartments of different depths or platforms at different elevations may be formed across the car in the region of the doorways. In placing each supporting or partitioning member in position the tongued end thereof to be engaged with the holder 23 is slipped endwise into the proper socket in said holder and then the opposite tongued end is brought into alinement with the lateral notch or notches in the holder 24 communicating with the proper receiving socket therein and the said tongued end is then slipped laterally through the notch or notches into the socket. By a reversal of this mode of application each supporting or partitioning member may be withdrawn from engagement with the holders, as will be readily understood.

By constructing the doorways and associated parts of the car body in the manner above described the interior of the car body, transversely of the car between the doorways, may be provided with compartments and supporting members or supporting platforms, whereby such portion of the interior of the body may be employed for storage purposes to increase the storage area of the body and the parts or goods to be shipped may be supported singly or in lots therein in such manner as to keep the lots separate for convenience in shipping and loading and unloading them as well as in transferring them from place to place. The improved doorway structure, furthermore, permits of the partial closing of each doorway in a car in a manner and for the purpose described, while leaving ample doorway space for ingress and egress of persons and passage of freight, and the remodeling of conventional types of box cars to increase their storage capacity.

While the constructions disclosed for the purposes are preferred, it will, of course, be understood that changes in the form, proportions and details of construction of the parts may be made within the scope of the appended claims without departing from the spirit or sacrificing any of the advantages of the invention.

Although the foregoing covers applications to cars with double doors, it should be specifically understood that the invention herein described may readily be applied to cars having single side doors and with any form of side posts, eaves beams, or side sills.

What I claim is:—

1. In a freight car, a car body having a doorway, a channeled holding member at one side of the doorway, a channeled holding member at the opposite side of the doorway having lateral passages communicating with the channel thereof, and partitioning or supporting members having end portions for detachable engagement with said channeled holding members.

2. In a freight car, a car having a doorway, a channeled holder at one side of the doorway having keeper sockets having entrance portions facing the doorway, a channeled holder at the opposite side of the doorway having keeper sockets opening into the doorway and having lateral entrance portions facing the exterior of the car, and a supporting or partitioning member detachably engageable at its ends with said keeper sockets.

3. In a freight car, a car having a doorway, holders at opposite sides of the doorway provided with holding means at different elevations, and a supporting or partitioning member detachably and interchangeably engageable at its ends with said holding means, the said holding means and ends of the member having coacting engaging portions whereby one end of the member is adapted for engagement with and disengagement from a holding means of one holder by endwise movement longitudinally of the car and the other end of said member is adapted for engagement with and disengagement from a holding means of the other holder by movements thereof transversely of the car.

4. In a freight car, a car having a doorway, holders at opposite sides of the doorway provided with holding means at different elevations, and a supporting or partitioning member detachably and interchangeably engageable at its ends with said holding means, the said holding means and ends of the member having coacting engaging portions whereby one end of the member is adapted for engagement with and disengagement from a holding means of one holder by endwise movement longitudinally of the car and the other end of said member is adapted to be positioned for engagement with and disengagement from a holding means of the other holder by movements thereof transversely of the car, the engaging portion on the second-named end of said member comprising a fastening element adapted when said end of said member is so positioned to be moved into or out of engagement with a holding means on the second-named holder.

5. In a freight car, a car having a doorway, holders at opposite sides of the doorway provided with holding means at different elevations, and a supporting or partitioning member detachably and interchangeably engageable at its ends with said holding means, the said holding means and ends of the member having coacting engaging portions whereby one end of the member is adapted for engagement with and disengagement from a holding means of one holder by endwise movement longitudinally of the car and the other end of said member is adapted to be positioned for engagement with and disengagement from a holding means of the other holder by movements thereof transversely of the car, the engaging portion on the second-named end of said member comprising a pivoted latch adapted when said end of said member is so positioned to be moved into or out of engagement with a holding means on the second-named holder.

6. In a freight car, a car having a doorway, holders at opposite sides of the doorway provided with holding means at different elevations, and a supporting or partitioning member detachably and interchangeably engageable at its ends with said holding means, the said holding means and ends of the member having coacting engaging portions whereby one end of the member is adapted for engagement with and disengagement from a holding means of one holder by endwise movement thereof in a direction longitudinally of the car and the other end of said member is adapted to be positioned for engagement with and disengagement from a holding means of the other holder by movement thereof in a direction at an angle to the first-named direction, the engaging portion on the second-named end of said member comprising a fastening element adapted when said end of said member is so positioned to be moved into or out of engagement with a holding means on the second-named holder.

7. In a freight car, a car having a doorway, holders at opposite sides of the doorway provided with holding means at different elevations, and a supporting or partitioning member detachably and interchangeably engageable at its ends with said holding means, the said holding means and ends of the member having coacting engaging portions whereby one end of the member is adapted for engagement with and disengagement from a holding means of one holder by endwise movement thereof longitudinally of the car and the other end of said member is adapted to be positioned for engagement with and disengagement from a holding means of the other holder by movements thereof in a direction at an angle to the first-named direction, the engaging portion on the second-named end of said member comprising a pivoted latch adapted when said end of said member is so positioned to be moved into or out of engagement with a holding means on the second-named holder.

8. In a box car, a car body having a doorway with a row of keepers at each side of the doorway extending substantially from bottom to top of the doorway, and a vertically adjustable partitioning or supporting member adapted to be positioned across the doorway at any elevation and engaged with selected keepers, said member being movable into and out of operative position with relation to the doorway in a direction transversely of the car and provided at its opposite ends with engaging means for engagement with the keepers, the engaging means at at least one end of the supporting member comprising a fastening element mounted thereon for movement into and out of keeper engaging position.

WILLIAM L. THOMAS.